United States Patent [19]

Somasundaram et al.

[11] Patent Number: 5,491,793
[45] Date of Patent: Feb. 13, 1996

[54] DEBUG SUPPORT IN A PROCESSOR CHIP

[75] Inventors: M. Somasundaram; Akira Watanabe, both of San Jose; James D. Huey, Sunnyvale; Dinesh Maheshwari, Santa Clara, all of Calif.

[73] Assignee: Fujitsu Limited, Japan

[21] Appl. No.: 321,576

[22] Filed: Oct. 11, 1994

Related U.S. Application Data

[63] Continuation of Ser. No. 924,699, Jul. 31, 1992, abandoned.

[51] Int. Cl.$^6$ ...................................... G06F 11/30
[52] U.S. Cl. ..................... 395/183.21; 395/182.08; 395/183.1; 395/183.11; 364/267; 364/267.2; 364/267.91; 364/285; 364/232.3; 364/927.81
[58] Field of Search .................... 395/575, 500, 395/375, 700; 371/16.1, 19, 16.2; 364/927.81, 232.3, 285, 267.91, 267, 267.2

[56] References Cited

U.S. PATENT DOCUMENTS

| | | | |
|---|---|---|---|
| 4,598,364 | 7/1986 | Gum et al. | 364/200 |
| 4,674,089 | 6/1987 | Popet et al. | 371/25 |
| 4,780,819 | 10/1988 | Kashiwagi | 364/200 |
| 4,811,208 | 3/1989 | Myers et al. | 364/200 |
| 4,901,259 | 2/1990 | Watkins | 364/578 |
| 4,924,382 | 5/1990 | Shouda | 364/251.3 |
| 4,954,942 | 9/1990 | Masuda et al. | 364/231 |
| 5,088,027 | 2/1992 | Tanagawa et al. | 395/575 |
| 5,127,103 | 6/1992 | Hill et al. | 395/575 |
| 5,132,971 | 7/1992 | Oguma et al. | 371/16.2 |
| 5,140,671 | 8/1992 | Hayes et al. | 395/76 |
| 5,165,036 | 11/1992 | Miyata et al. | 395/800 |
| 5,237,700 | 8/1993 | Johnson et al. | 395/775 |
| 5,278,962 | 1/1994 | Masuda et al. | 395/400 |
| 5,345,580 | 9/1994 | Tamaru et al. | 395/500 |

Primary Examiner—Robert W. Beausoliel, Jr.
Assistant Examiner—Dieu-Minh Le
Attorney, Agent, or Firm—Christie, Parker & Hale

[57] ABSTRACT

A central processing unit (CPU) with facilities for debug support. The debug support facilities include debug support unit (DSU), a debug support interface bus, and a diagnostic instrument. During an execution trace, the DSU transmits trace data such as an instruction address and a trace status via the bus to the diagnostic instrument. Instruction addresses are sent in 4-bit segments in one clock cycle during a trace. Trace status includes an indication of non-sequential instruction execution by the Instruction Unit (IU). A control bit is used to toggle a hold on IU operation where a non-sequential instruction is encountered in trace mode. The diagnostic instrument uses trace data provided by the DSU to generate a complete execution trace in real-time. During breakpoint operations, input such as a debug instruction is provided by the diagnostic instrument via the debug support interface bus to the CPU for execution thereby.

44 Claims, 11 Drawing Sheets

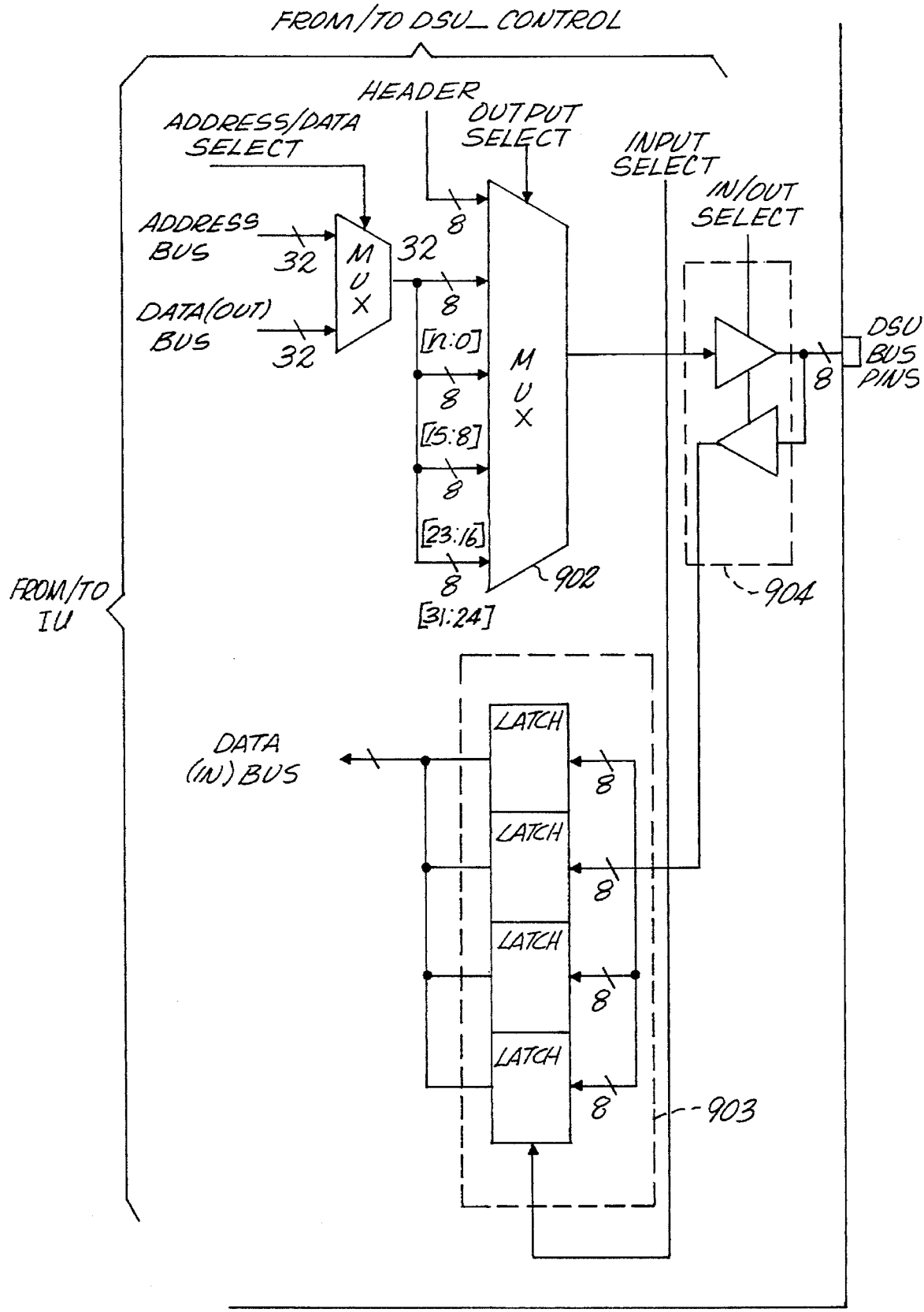

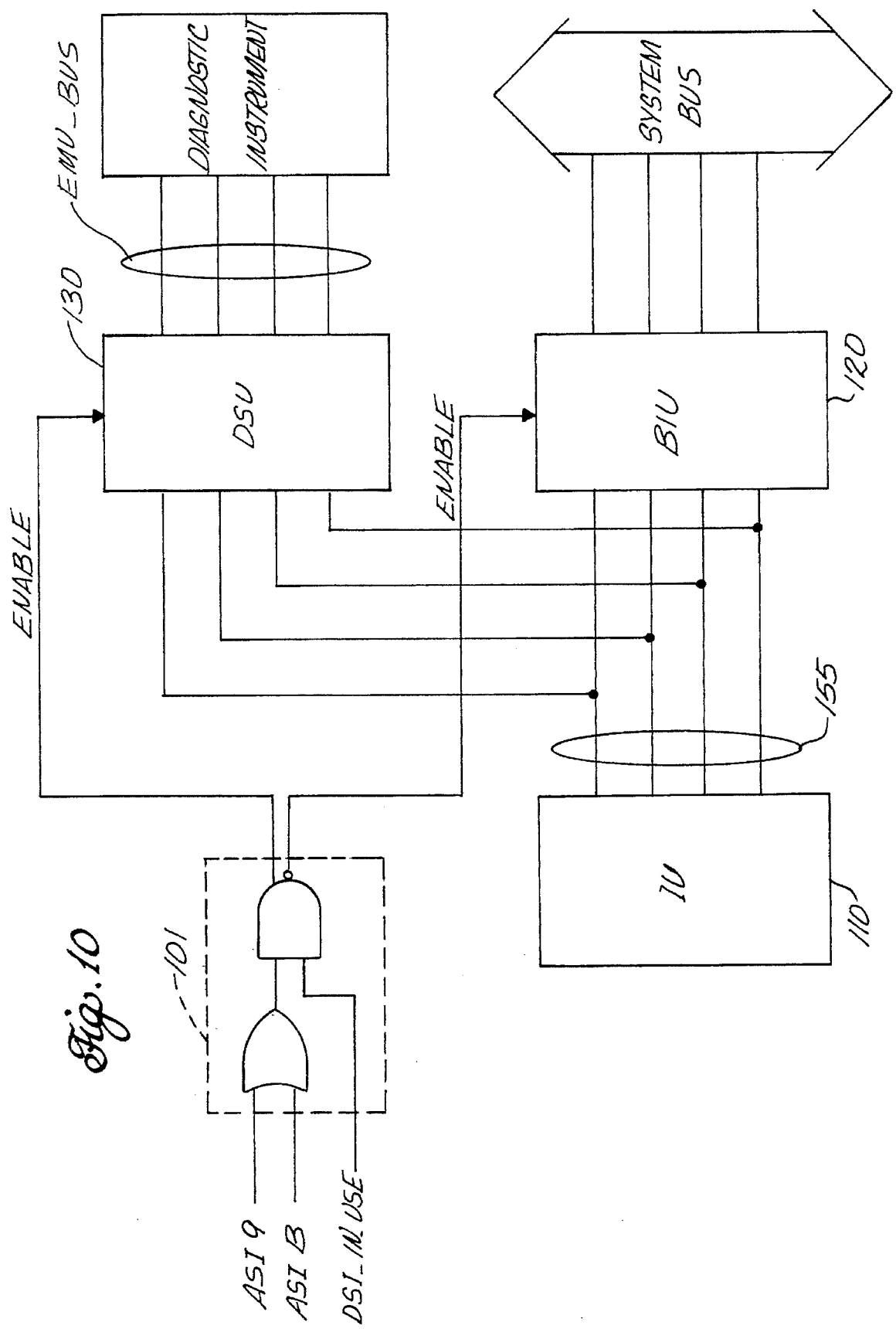

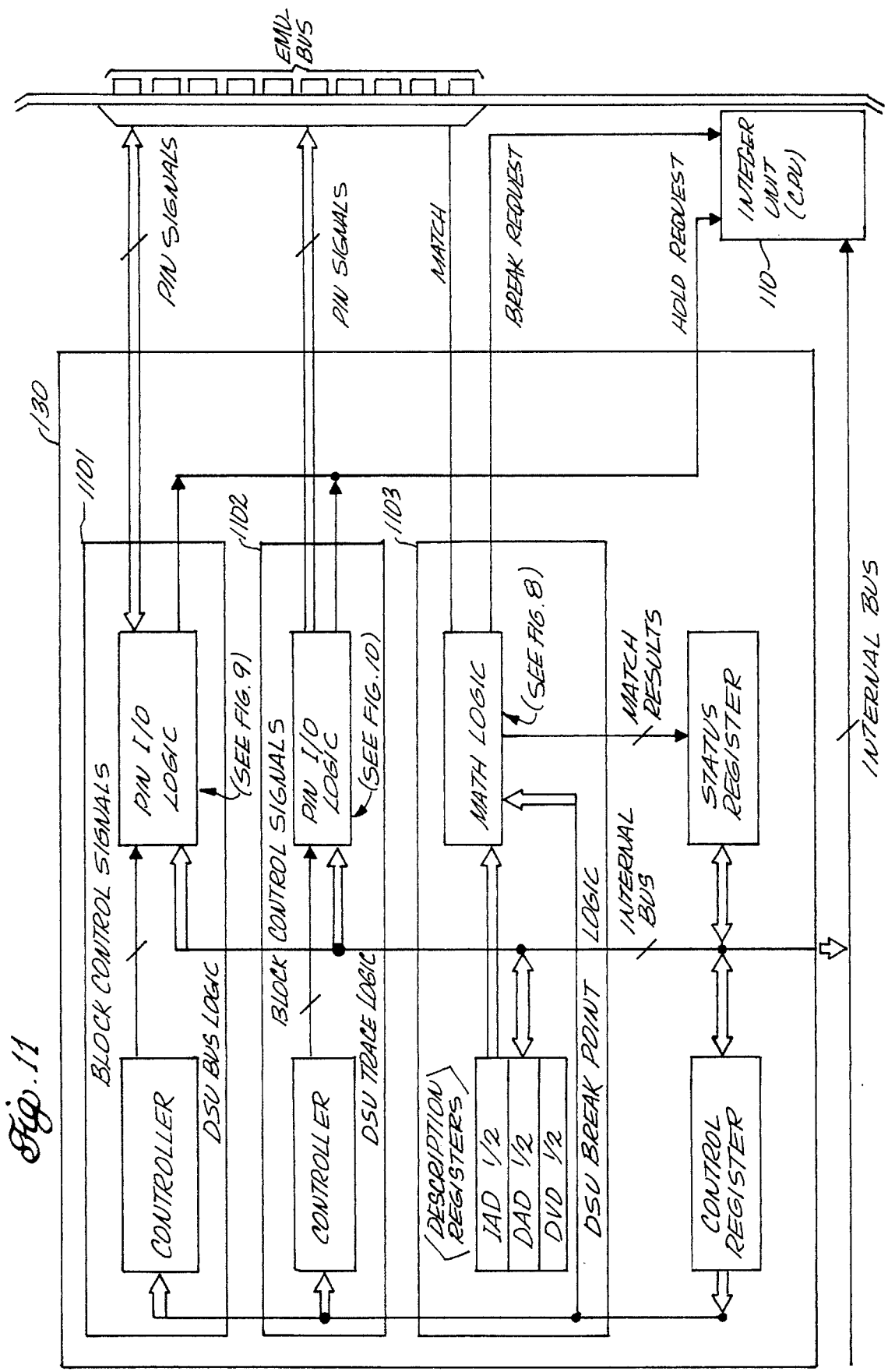

1

DEBUG SUPPORT IN A PROCESSOR CHIP

CROSS-REFERENCE TO RELATED APPLICATION

This is a continuation of application Ser. No. 07/924,699, filed Jul. 31, 1992, now abandoned.

FIELD OF THE INVENTION

The present invention relates in general to debug support in a single chip central processing unit (CPU) and specifically to an interface in a single chip CPU for coupling to a diagnostic instrument to facilitate debugging and tracing of transactions performed by the CPU.

BACKGROUND OF THE INVENTION

In a typical procedure of bringing up a computer, a set of diagnostic programs is first run. The diagnostic programs are typically written to test specific components of the computer and, in the event of a failure, provide error message(s) identifying or isolating the cause(s) thereof. Upon completion of the diagnostic programs, benchmark application programs may also be executed. The benchmark application programs typically comprise routines that exercise the functions expected from the computer and are run to determine whether these functions are performed correctly thereby.

In running the test programs and/or the benchmark application programs, one often encounters failures that do not manifest themselves until after processing has proceeded for a substantial period of time past the failures, or failures (such as timing errors caused by unexpected capacitance in signal paths) that manifest only when the computer runs at full speed (as oppose to those that manifest in "single-cycle" which are relatively more easy to debug). When such types of failures occur, one vital debugging tool is to obtain a trace of the transactions performed by the computer. Tracing the transactions performed by the computer often means tracing the instructions it executes. From the trace, the activities of the computer during the time of a failure can be examined and from such activities the possible area of the failure can be isolated.

Tracing instructions is also useful for developing and debugging a computer software, where the trace can assist in understanding how and when problematic portions of the software are entered or exited.

Another often-used tool for debugging a computer system and/or computer software is to set breakpoints at selected addresses of the software. The breakpoints trap the flow of the software, such as whether, when and how certain portions of a software are entered and exited. From the flow, the behavior of the software can be examined.

Setting breakpoints also facilitates debugging and development of a computer or a computer software by allowing trial values to be injected at various processing stages of the software.

Tracing and trapping instructions are typically accomplished in prior art computers by a debug support circuit which is connected to the system bus—the bus that connects the CPU to the external memory and other peripheral devices. Connecting the debug support circuit to the system bus is convenient in prior art computers because it is where addresses, instructions and data of the computer flow. Moreover, by connecting the debug support circuit to the system bus, there is no need to add new input/output pins to a semiconductor chip; otherwise, the new I/O pins needed may be significant because instruction tracing requires outputting addresses whose length is normally equal to the width of the computer.

Unfortunately, providing the debug support circuit from the system bus also increases the electrical load of the system bus and interferes with the design and operation thereof. Moreover, debug support operations may be handicapped by shared use of the system bus, as they may be interfered by operations of the external memory and other peripheral devices.

Connecting the debug support circuit to the system bus is also undesirable for CPUs that use internal cache(s). In these CPUs, memory access is not performed if there is a cache hit; that is, instructions, data and addresses will not pass through the system bus when they are already present in the internal cache. If the instructions, data or addresses are accessed without passing through the system bus, they may become undetectable to the debug support device.

What is needed in view of the foregoing is a new debug support interface in a CPU whereby tracing and trapping of instructions can be achieved without using the system bus. Preferably, the new debug support interface allows tracing and trapping of instructions even when the CPU has an internal cache. Moreover, because increasing input/output pins of a semiconductor chip has an adverse effect on the cost and design thereof, it is also important that the new debug support interface does not significantly increase the number of input/output pins of the chip.

SUMMARY OF THE INVENTION

The present invention discloses a single chip central processing unit (CPU) for coupling with a external memory via a system bus to form a data processing system. The central processing unit comprises a processor having means for decoding instructions and means for executing instructions. The central processing unit also comprises a first bus for connecting the processor with the system bus to communicate instructions and data between the processor and the external memory. The central processing unit according to the present invention also comprises a second bus for connecting the processor with an external diagnostic instrument to communicate instructions and data between the processor and the diagnostic instrument.

The present invention also discloses a method in a computer of providing a trace of instructions processed by a processor. The method comprises the step of outputting data of the trace through a bus which is smaller in width than the trace data and the step of maintaining the rate of the processor substantially at its normal rate when the trace data are output.

The present invention also discloses a computer system, having a first memory, a second memory, a processor fetching instructions from a memory space, and means for mapping said memory space into said first memory during normal operations and mapping said memory space into said second memory during debug support operation.

BRIEF DESCRIPTION OF THE DRAWINGS

FIG. 9 is a schematic diagram illustrating the interface within the DSU for communicating with the diagnostic instrument.

FIG. 10 is a block diagram illustrating how memory spaces are mapped to the diagnostic instrument memory during a break.

FIG. 11 is a schematic block diagram of a debug support unit embodying the present invention.

DESCRIPTION OF THE PREFERRED EMBODIMENT

Figure 1:
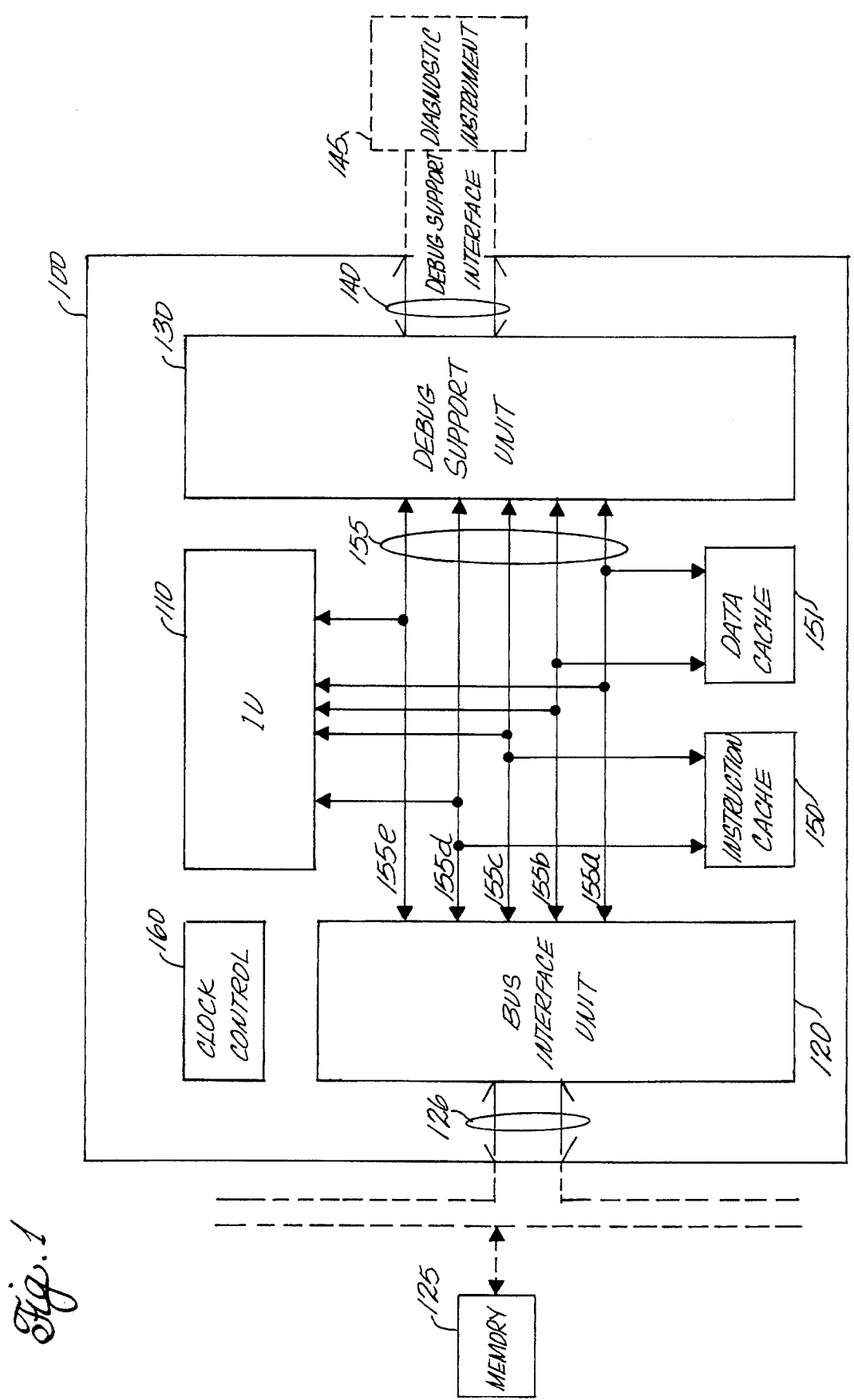
FIG. 1 is a schematic block diagram illustrating a single chip central processing unit wherein the present invention is embodied.

FIG. 1 is a schematic block diagram illustrating a single chip central processing unit (CPU) 100 wherein the present invention is embodied. The CPU 100 has an architecture generally described in "The SPARC™ Architecture Manual, Version 8", Sun Microsystems, Inc Jan. 30, 1991, which is incorporated herein by reference. The CPU 100 is a 32-bit wide processing unit. Accordingly, the basic format of its instructions, its data and addresses and its components such as busses, arithmetic and logic unit and registers are 32 bits wide. It is noted, however, that the width is specifically mentioned herein to facilitate discussion and understanding of the preferred embodiment and is not intended to limit the applicability of the present invention.

Like to a conventional computer, CPU 100 fetches instructions and data from an external memory 125. The fetched instructions are processed by an Integer Unit (IU) 110 located within the CPU 100. The term "Integer Unit" is used herein to conform with the terminology set forth by the SPARC Architecture and is not intended as limitation of the applicability of the present invention. The IU 110 generally possesses facilities normally found in conventional computers, such as instruction sequence logic, a program counter, etc.

The CPU 100 is connected to the external memory 125 via a 32-bit wide conventional bus 126, commonly referred to as a system bus. Besides the external memory 125, the system bus 126 also connects the CPU 100 to other peripheral devices, such as disks, monitors, keyboard, mouses, etc. (not shown). The CPU 100 is connected to the system bus 126 through a bus interface unit (BIU) 120. BIU 120 operates to control and buffer signals passing between the CPU 100 and the external memory 125, and between the CPU 100 and other peripheral devices.

According to the preferred embodiment, CPU 100 can directly address up to one terabyte ($10^{12}$) of memory, organized into 256 address spaces of 4 gigabytes ($10^9$) each. These address spaces may or may not overlap in physical memory, depending on the particular system design.

In accordance with the SPARC architecture, a memory access involves an 8-bit Address Space Identifier (ASI) as well as a 32-bit address. The ASI selects one of the address spaces, and the address selects a 32-bit word within that space. The assignment of the address spaces is listed in Table 1.

It is noted from Table 1 that ASI 0×9 (hereinafter, "0×" is used to designate that the number that follows is an hexadecimal number; for example, 0×9 means a hexadecimal value of "9") is reserved for storing instructions to be executed by the CPU 100 in supervisor mode and ASI 0×B is reserved for storing data to be executed by the CPU 100 in supervisor mode.

FIG. 1 also shows a clock control logic 160 which supplies clock and other control signals needed for the operation of various components within the computer 100. Description of the clock control logic 160 is deemed unnecessary as it is not needed for the understanding and use of the present invention and because the design of the clock control logic 160 is so dependent on the particular design of a CPU.

Similar to a conventional computer, CPU 100 has logic for supporting interrupts, including those initiated externally such as by the peripheral devices, and those caused by executions of instructions. The later interrupts are also called "traps".

Interrupts and traps can be enabled and disabled in CPU 100 as in conventional computers. When enabled, interrupts and traps cause control of the CPU 100 to be transferred (i.e. a process switch) to a service routine. In accordance with the SPARC architecture, control of the CPU 100 is transferred to an address generated by a trap base register (TBR). One field of the TBR contains the base address of a trap dispatch table. Normally, an 8-bit trap type number serves as an offset into this table. Unlike other traps, however, pointers to breakpoint trap routines are not generated from the TBR; rather, they are set to start at 0×00000ff0.

Similar to a conventional computer, CPU 100 is provided with means for saving the state of the CPU 100 when an interrupt or trap occurs before entering a service routine. Similar to a conventional computer, it also has means for restoring the CPU 100 to the interrupted state upon return from the service routine.

To reduce access time of instructions/data, CPU 100 employs an hierarchical memory architecture. Under such memory architecture, instructions and data from the external memory 125 are first staged respectively into an 32-bit wide instruction cache 150 and a 32-bit wide data cache 151, both of which are internal to the chip. When the IU 110 needs to fetch memory items such as instructions and data, a check is made to see if they have already been staged to the caches 150, 151. If a copy of the required memory item is already present in the caches (that is, if there is a "cache hit"), the copy in the caches 150, 151 is accessed by the IU 110 and access to the external memory 125 is not made. In other words, if there exists a copy of the data or instructions in the caches 150, 151, no address and access signals are output by the CPU 100 to the system bus 126.

The BIU 120, the IU 110 and the caches 150, 151 are coupled by an internal bus 155 which comprises a signal path for carrying instruction (also called instruction_data under the SPARC convention) 155a, a signal path for carrying addresses of instructions (also called instruction_ addresses under the SPARC convention) 155b, a signal path for carrying addresses of data (also called data_addresses under the SPARC convention) 155c, a signal path for carrying data (also called data_data under the SPARC convention) 155d and a signal path for carrying control signals 155e.

In accordance with the present invention, CPU 100 also comprises a debug support bus (EMU_BUS) 140 for connecting to a diagnostic instrument 145. The availability of EMU_BUS 140 allows the diagnostic instrument 145 to set breakpoints in the CPU 100 as well as to obtain a complete trace of instructions processed by the CPU 100.

The EMU_BUS 140 occupies ten input/output pins in the CPU chip. The signals assigned to these ten pins are shown schematically in FIG. 2 and their functions are listed in Table 2. The EMU_BUS 140 is connected to the CPU 100 via a debug support unit (DSU) 130. The DSU 130 has a plurality of registers, including six on-chip breakpoint descriptor registers. Two of these descriptor registers are provided for setting breakpoints on instruction addresses, two are provided for setting breakpoints on data addresses and two are provided for setting breakpoints on data values. DSU 130 is also provided with a debug control register for controlling a debug operation and a DSU status register for reporting status of a debug operation. Definitions of the various bits in the DSU control register are listed in Table 3. Definitions of the various bits in the DSU status register are listed in Table 4.

The DSU breakpoint descriptor registers, DSU control register and DSU status register are memory mapped to ASI 0×1 and their respective addresses are listed in Table 5.

Figure 2:
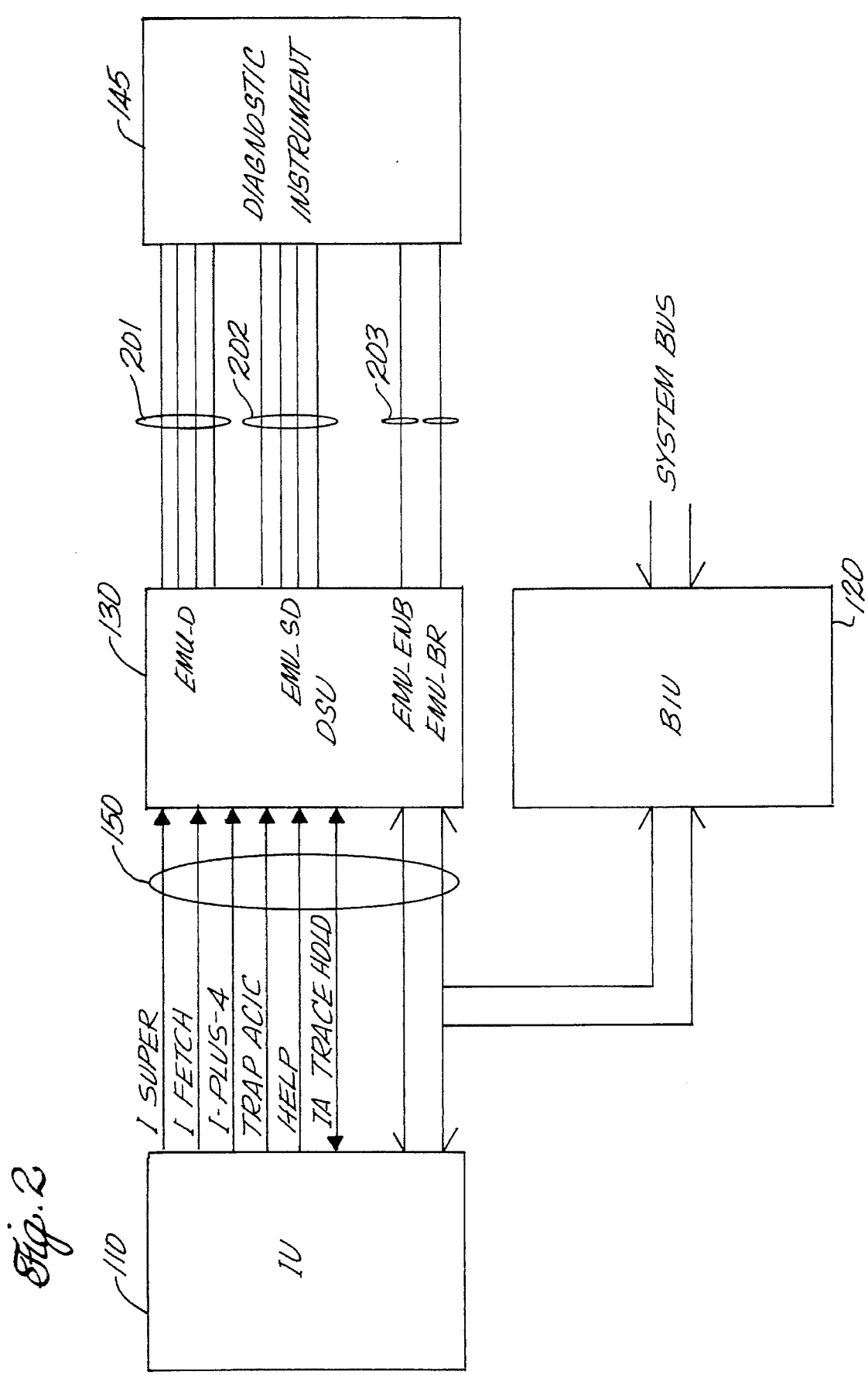
FIG. 2 is a schematic diagram illustrating the interface signals between the IU and the DSU, as well as the interface signals between the DSU and the diagnostic instrument shown in FIG. 1.

With reference to FIG. 2, a plurality of signals are provided between the DSU 130 and the IU 110, including those signals listed in Table 6.

One important debugging tool provided under the preferred embodiment of the present invention is the ability to trace a sequence of instructions executed by the CPU 100. The instructions are traced by their respective addresses, which can be obtained either from the internal bus of the addresses sent by the IU 110 to the internal cache 150 during an instruction fetch, or from the program counter (PC) of the CPU 100.

To be effective for debugging, it is preferable for a trace to contain all or almost all of the instruction addresses. It is also preferably that trace be performed with minimal intrusion to the operation of the CPU 100 (for example, slowing it down).

It is recalled that CPU 100 uses a 32-bit wide address to access instructions. However, it is also recalled that in order to minimize the number of I/O pins on the chip, only ten input/output pins are provided for the EMU_BUS 140. Of these 10 pins, eight pins are assigned for communicating data/addresses/instructions between the CPU 100 and the diagnostic instrument 145. Therefore, even if all these eight pins are used, at least four cycles are required to output one address. However, the highest throughput of the CPU 100 is one instruction per cycle. If the throughput of the CPU 100 is to be maintained during a trace operation, the trace would omit at least three addresses for every address output (i.e. the trace is incomplete). However, a trace with such a gap may not be effective for debugging purposes because important information may have left out.

On the other hand, if a complete trace is to be output, the CPU 100 must be slowed down. However, when the CPU 100 is slowed down, the trace obtained thereby may fail to capture crucial timing characteristics of the CPU 100 and/or fail to reflect its performance under true working conditions.

According to the present invention, a trace is performed by outputting the instruction addresses on bits EMU_ D<3:0>. An instruction address is output in segments of 4 bits each during a trace operation, so it can be output via EMU_D<3:0>. Each of these 4-bit segments is hereinafter referred to as a nibble. Since an instruction address is 32 bits long, a total of 8 nibbles are formed and thus a total of 8 cycles are required to completely output an address. An instruction address is output by outputting the most significant nibble (bits<32:29>) first, followed by the next most significant nibble (bit<28:25>), etc.

Because memory items are addressed by 32-bit words, the last two bits of an instruction address are always zero. Therefore, these two bits are not output in the trace. Instead, bit <1> of the last nibble is advantageously used to send an indication to the diagnostic instrument 145 to indicate whether CPU 100 is in supervisor state. Bit <0> of the last nibble is advantageously used to send an acknowledgment to the diagnostic instrument 145 that a trap is taken.

When each nibble is sent in a cycle, a three-bit trace status is concurrently sent through EMU_SD<2:0>. These three bits can be decoded into the eight different messages shown in Table 7. The status information EMU_SD<2:0> includes an indication, "sequential fetch", which indicates whether the CPU 100 is executing a next sequential instruction in the corresponding cycle. From the above-identified indication, the diagnostic instrument 145 is informed that sequential instructions are performed and therefore a complete trace can be reconstructed even when instruction addresses are not sent. The status information EMU_SD<2:0> also include an indication, MSN (IA<31:28>), which indicates whether EMU_D<3:0> currently outputting a most significant nibble.

When a jump or a branch is taken, that is, when the instruction processed becomes out of sequence, the jumped-to address must be output to the diagnostic instrument 145 because it can no longer rely on the sequential nature of the instructions to reconstruct the trace. Therefore, if the DSU 130 is busy in outputting the nibbles of an instruction address when an out-of-sequence instruction is executed, it sends a HOLD signal to the IU 110. In response to the HOLD signal, IU 110 becomes temporarily dormant. After the nibbles of the outputting instruction address are completely output, the HOLD signal is dropped because DSU will then have time to output the out-of-sequence instruction address. When the HOLD signal is dropped, the IU 110 can continue processing.

For additional flexibility, a TRACE_NOT_HOLD_IU (bit 11) bit is provided in the DSU control register. When this bit is set, processing by the IU 110 is not held even if the IU 110 executes an out-of-sequence instruction. As a result, operation of the IU is completely free from interruption by the trace operation. However, because an out-of-sequence instruction is taken, the first address of the new sequence may be missing in the trace result.

Figure 3:
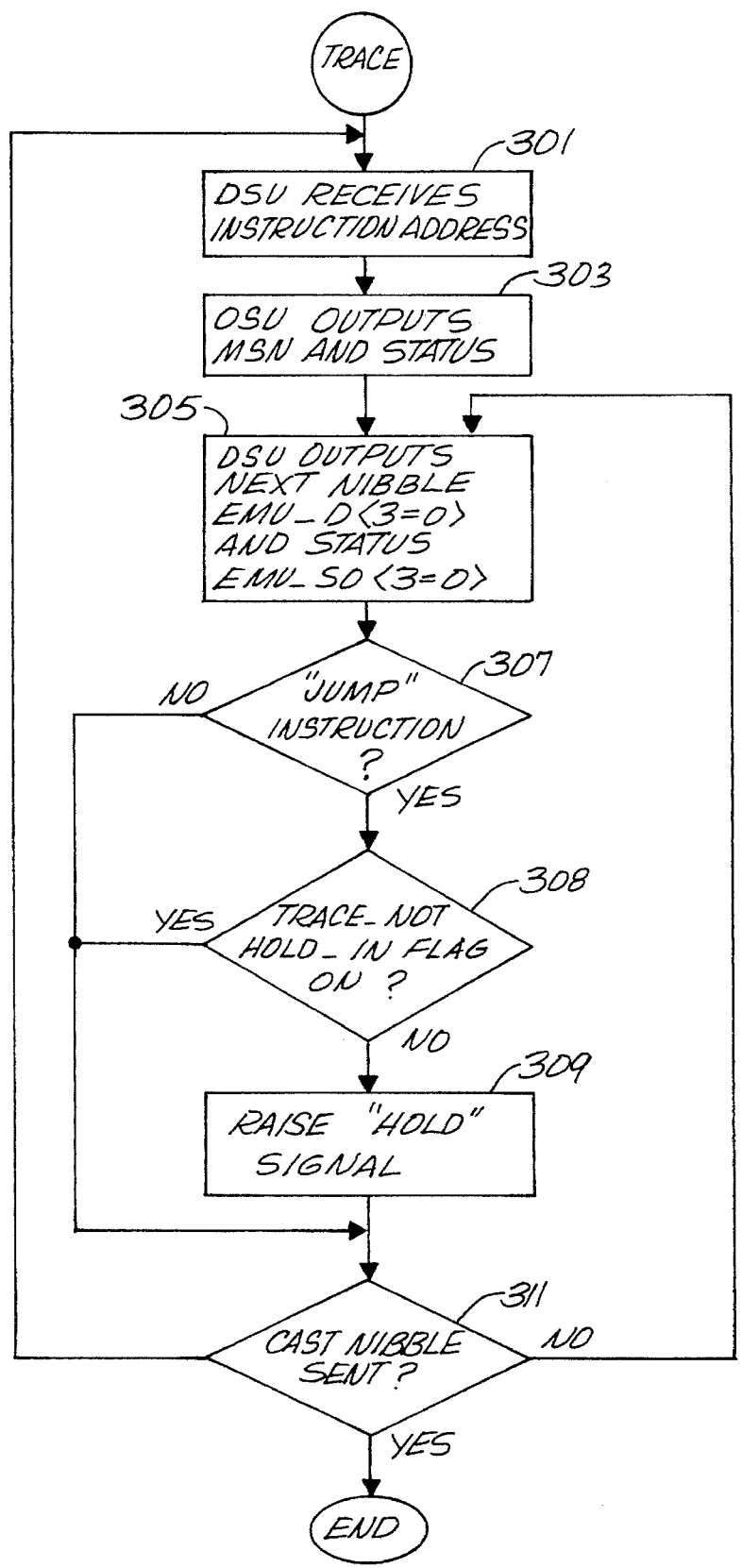
FIG. 3 is a flow chart illustrating the general steps of a trace operation.

A trace operation is illustrated generally in the flow chart of FIG. 3. In the first of every eight cycles, the DSU 130 obtains the address of the instruction executed by the IU 110 (block 301). The address is then partitioned into eight nibbles. In block 303, the most significant nibble is output from EMU_D<3:0>, along with a status from EMU_ SD<2:0>. The status EMU_SD<2:0> is set to "111" to indicate to the diagnostic instrument 145 that the nibble output in the cycle is the most significant nibble of an instruction address.

The rest of the nibbles are output in successive cycles (block 305). Concurrently with the outputting of each nibble, a new instruction is processed by the IU 110 (unless the HOLD signal is set). A determination is made to see whether the instruction processed by IU 110 is a jump or branch instruction (block 307). Such determination can be made by checking the I_PLUS_4 line from the IU 110 (see Table 6). Signals such as I_PLUS_4 can typically be found in conventional computers, when they are generated to inform the instruction sequence logic in a computer of whether the next instruction to be processed is an instruction sequential to the instruction currently being executed, or whether it is a target instruction of a branch/jump operation.

Referring back to the flow chart of FIG. 3, if a jump/branch is taken, the DSU 130 checks whether the "TRACE_NOT_HOLD_IU" flag (bit 11) in the DSU control register is set (block 308). If this flag is off and if the next instruction is an out-of-sequence instruction, DSU 130 sends a HOLD signal to the IU 110 (block 309). In response, IU 110 delays processing of the new instruction until the HOLD signal is dropped.

The HOLD signal is dropped when the DSU 130 sends the last nibble of the outputting instruction address. In block 311, a determination is made to see whether the last nibble is sent. If the last nibble is sent, the DSU 130 obtains another instruction from the IU 110 (block 301). Otherwise, if the last nibble is not sent, DSU 130 returns to block 305 to send the next nibble. The trace operation continues in similar manner.

Figure 4A:
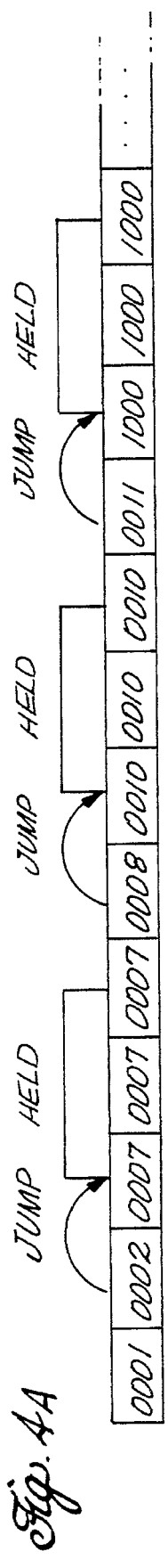
FIG. 4A–4C are a schematic diagrams showing how a complete instruction trace is provided under the preferred embodiment of the present invention.
Figure 4B:
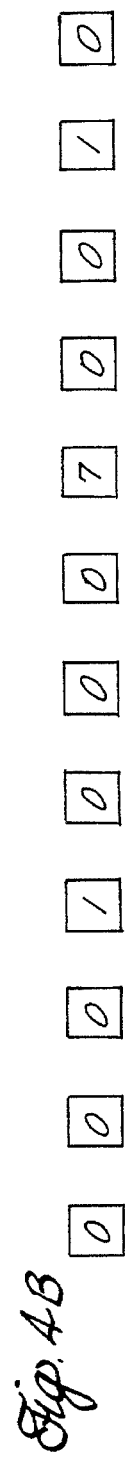
Figure 4C:
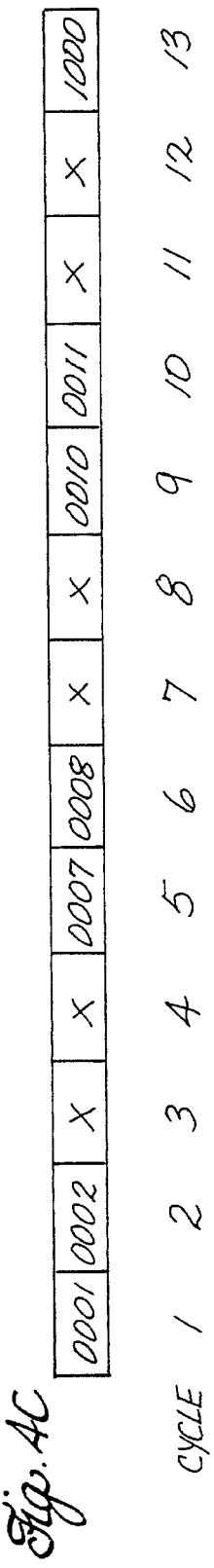

FIGS. 4a–4c show a specific example of a trace operation. For ease of discussion, it is herein assumed that instruction addresses of the computer has only 16 bits.

FIG. 4a shows a hypothetical sequence of instructions to be performed by the CPU 100. This sequence includes a first instruction located at location 0001 and its next sequential instruction located at location 0002. The 0002 instruction causes the CPU 100 to take a branch to location 0007. Instruction 0007 is followed by a next sequential instruction at 0008 which causes the CPU 100 to jump to location 0010. After instruction 0010 is executed, a next sequential instruction 0011 is executed, which causes the CPU 100 to jump to location 1000.

FIG. 4b shows how a complete trace of the instructions is accomplished. In cycle 1, IU 110 sends the address 0001 to the DSU 130. Upon receiving the address, DSU 130 sends the first nibble "0" of the address through EMU_D<3:0> to the diagnostic instrument 145. The nibble is stored by the diagnostic instrument 145. DSU 130 also sets EMU_SD<2:0> to "111" to indicate that this is the most significant nibble of an instruction and that this is not a sequential instruction. For purposes to be described below, the diagnostic instrument 145 initializes a counter in this cycle.

In cycle 2, IU 110 sends the address 0002, along with the I-PLUS-4 bit to the DSU 130. At the same time, DSU 130 sends the second nibble "0" through EMU_D<3:0>, which is stored by the diagnostic instrument 145. DSU 110 also sets EMU_SD to "010" to inform the diagnostic instrument 145 that a next sequential instruction has been performed by the IU 110. The diagnostic instrument 145 can either store this status or it can, in response to the status, increments the content of the counter. From the stored status or from the value of the counter, the diagnostic instrument 145 can later reconstruct the instruction sequence.

In cycle 3, IU 110 sends address 0007 to the DSU 130. However, because a jump is performed, it deactivates the I-PLUS-4 bit. Because DSU 130 has not finished sending the nibbles of instruction 0001, when it senses that the I-PLUS-4 bit is deactivated, it sends the HOLD signal to the IU 110 (assuming that the "Trace_Not_Hold_IU" bit is not set). In response to the HOLD signal, IU 110 suspends further processing. The DSU 130 continues to send the third nibble "0" of instruction 0001, which is received and stored by the diagnostic instrument 145. Along with the third nibble, EMU_SD is set by DSU 130 to "001".

In cycle 4, processing by the IU 110 is still held by the HOLD signal. The DSU 130 sends the last nibble "1", which is received and stored by the diagnostic instrument 145. EMU_SD is set by DSU 130 to "001". Therefore, at the end of cycle 4, the last nibble of the first address is completely sent to the diagnostic instrument 145. From the nibbles, the diagnostic instrument 145 can reconstruct address 0001. Moreover, based upon the stored statuses or the value of the counter, DSU 130 can reconstruct the address of 0002 (simply for adding the length of an instruction). When the last nibble is sent, DSU 130 drops the HOLD signal.

In cycle 5, DSU 130 sends the first nibble "0" of address 0007 to the diagnostic instrument 145. EMU_SD<2:0> is also set to "111" as in cycle 1. Because the HOLD signal is dropped, IU 110 can continue processing the next instruction.

In cycle 6, IU 110 sends address 0008 to the DSU 130. Similar to Step 2, DSU 110 sets EMU_SD to "010" to inform the diagnostic instrument 145 that the next sequential instruction is performed.

The rest of the cycles are performed in a manner similar to those described in the previous cycles, specifically cycles 1, 2, 3 and 4.

FIG. 4c illustrates how the above-described trace data are reconstructed in the diagnostic instrument 145. It can seen that a complete trace can be obtained even though only eight bits are available for output the trace data.

Figure 5:
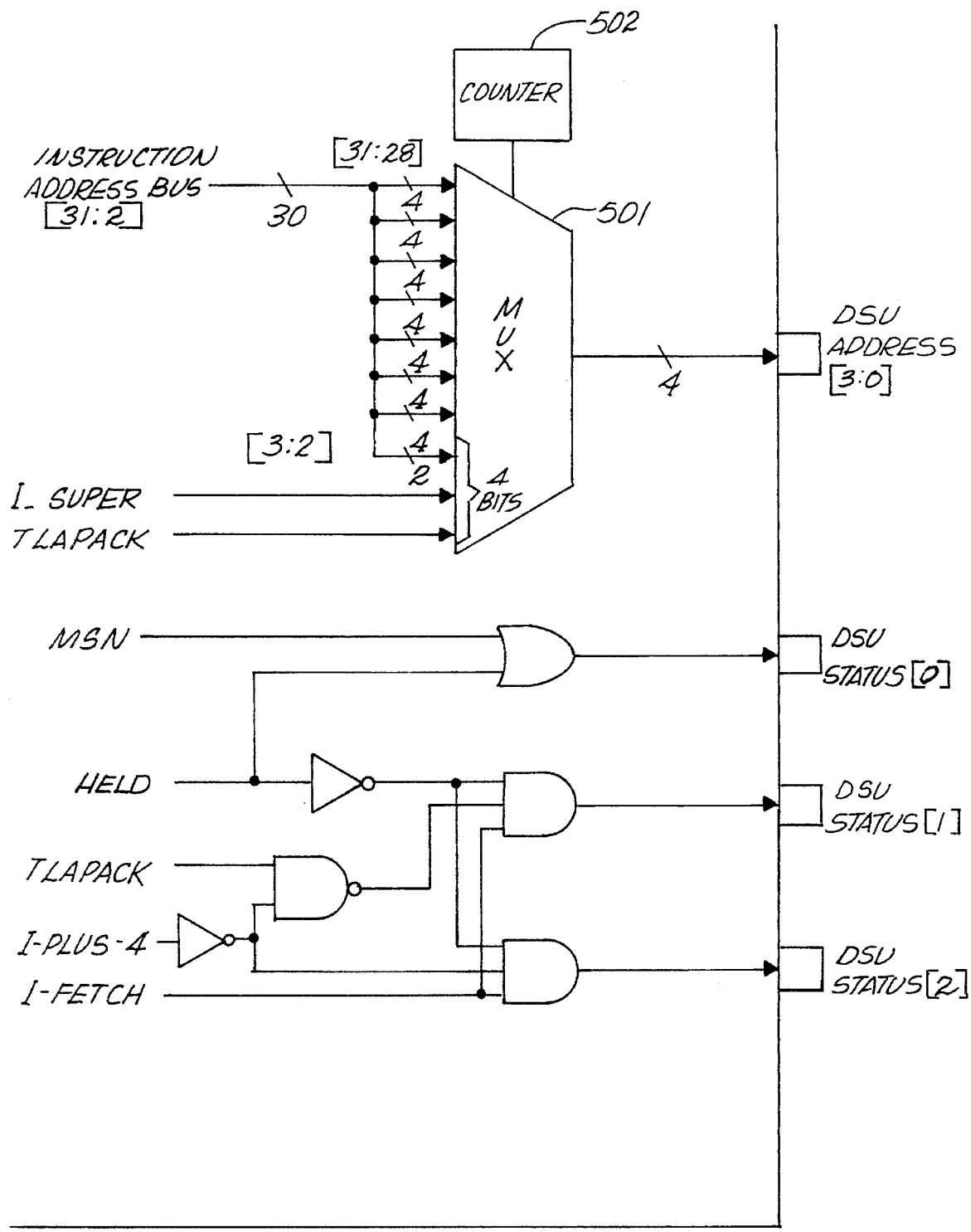
FIG. 5 is a schematic block diagram which illustrates the components tin the debug support unit for outputting a trace of instructions.

FIG. 5 is a schematic block diagram illustrating the general logic within the DSU 130 for outputting the trace data. As stated, DSU 130 is connected to the instruction address bus 155b. When an address is received by the DSU 130, it is segmented into eight nibbles. Each of these nibbles is connected to an input of a multiplexor 501. It is recalled that since a memory is addressed in words only, the least significant two bits of the address are always zero. Therefore, these two bits are not connected to the multiplexor 501. Instead, these last two bits are connected to an ISUPER signal and a TRAP-ACK signal. The ISUPER is a signal which indicates whether the IU 110 is operating in supervisor mode. The TRAP-ACK signal is used to acknowledge that a trap operation is performed.

To output the nibbles in sequence, one implementation is to provide a three-bit counter 502 the output of which controls the multiplexor 501. The multiplexor 501, in response to the output of the counter 502, outputs the nibbles through EMU_D<3:0> in eight successive cycles.

Also connected to the DSU 130 is a signal MSN from the IU 110. The MSN signal indicates whether the nibble being output from the IU 110 is the most significant nibble. It can be found in the instruction sequence logic of many conventional computers.

Also connected to the DSU 130 are a HELD signal which indicates whether the IU 110 is held; a TRAP ACK which indicates whether a trap is taken; the I-PLUS-4 as previously described, and an IFETCH signal which indicates whether the IU 110 is performing an instruction fetch.

The above signals are input into a logic shown in FIG. 5. Through the logic, the status signals EMU_SD<2:0> as shown in Table 7 are encoded.

Also output from the DSU 130 is an EMU_SD<3> signal. This signal is used to indicate whether one or more of the breakpoint conditions defined by the DSU descriptor registers and the DSU control register is matched. This signal can advantageously be used to perform complex breakpoint operations, as will be described hereinafter.

Another important debugging tool provided in the CPU 100 is the ability to set breakpoints to monitor various addresses of a program and/or to monitor various data values. When a breakpoint is encountered, the diagnostic instrument 145 is notified.

CPU 100 provides a diagnostic engineer with two options with regard to breakpoint operations. Under the first option, operation of the CPU 100 is interrupted. The diagnostic instrument 145 can then inject instructions/data into the CPU 100 for execution thereby. Under the second option, operation of the CPU 100 is not interrupted. However, notification of the breakpoint is sent to the diagnostic instrument 145 through EMU_SD<3> as described above. The diagnostic instrument 145 may be programmed to perform specific actions, such as by monitoring for certain pattern of breakpoints, for example, to monitor for a breakpoint that is encountered for the sixth time or to monitor for a condition in which a first breakpoint and a second breakpoint are encountered successively. The notification from EMU_SD<3> can be used to drive such program.

The breakpoints are defined by the DSU descriptor registers and by the DSU control registers. There are two breakpoint descriptor registers defining instruction address breakpoints. Two descriptor registers are provided for defining data address breakpoints and two are provided for defining data value breakpoints. When these descriptor registers is used for creating a breakpoint, corresponding bit(s) in the DSU Control Register, as shown in Table 3, must be set.

The data value description registers work in either one of two ways. If the value of data_value_mask bit in the DSU Control Register is "1", the data value descriptor register 2 is used as a mask for data value descriptor register 1. In this mode, only those bits of data value descriptor 1 are compared, for which the mask bit is "1". All other bits are ignored in the breakpoint comparison. If the data_value_mask bit is "0", the data value descriptor registers 1 and 2 act as the lower and upper bound respectively, for a range comparison. The break condition is determined by the values of the data value condition bit in the debug control register. If the data value condition is a "0", then the break condition is given by the expression:

> data value description 1 ≦
> accessed value ≦
> data value descriptor 2

If the data_value_condition bit is a "1", this break condition is inverted, turning the comparison into an "out-of-range" test.

The data value comparison may be conditioned by the type of transaction ("load" or "store") that is being performed. The condition is defined by encoding of the data_value_transaction_ type bits in the DSU control register shown in Table 3.

A break occurs when one or more condition, instruction address, data address or data value set forth in the descriptor registers is matched. A break may also be caused externally and asynchronously by activating the EMU_BRK pin.

A break causes the CPU 100 to take a trap in the same way as a reset or an exception causes the CPU 100 to take a trap. Breakpoint traps have a priority less than the other synchronous traps, but greater than trap instructions or external interrupts. When a breakpoint trap is recognized by the IU 110, it branches to address 0x00000ff0.

Figure 6:
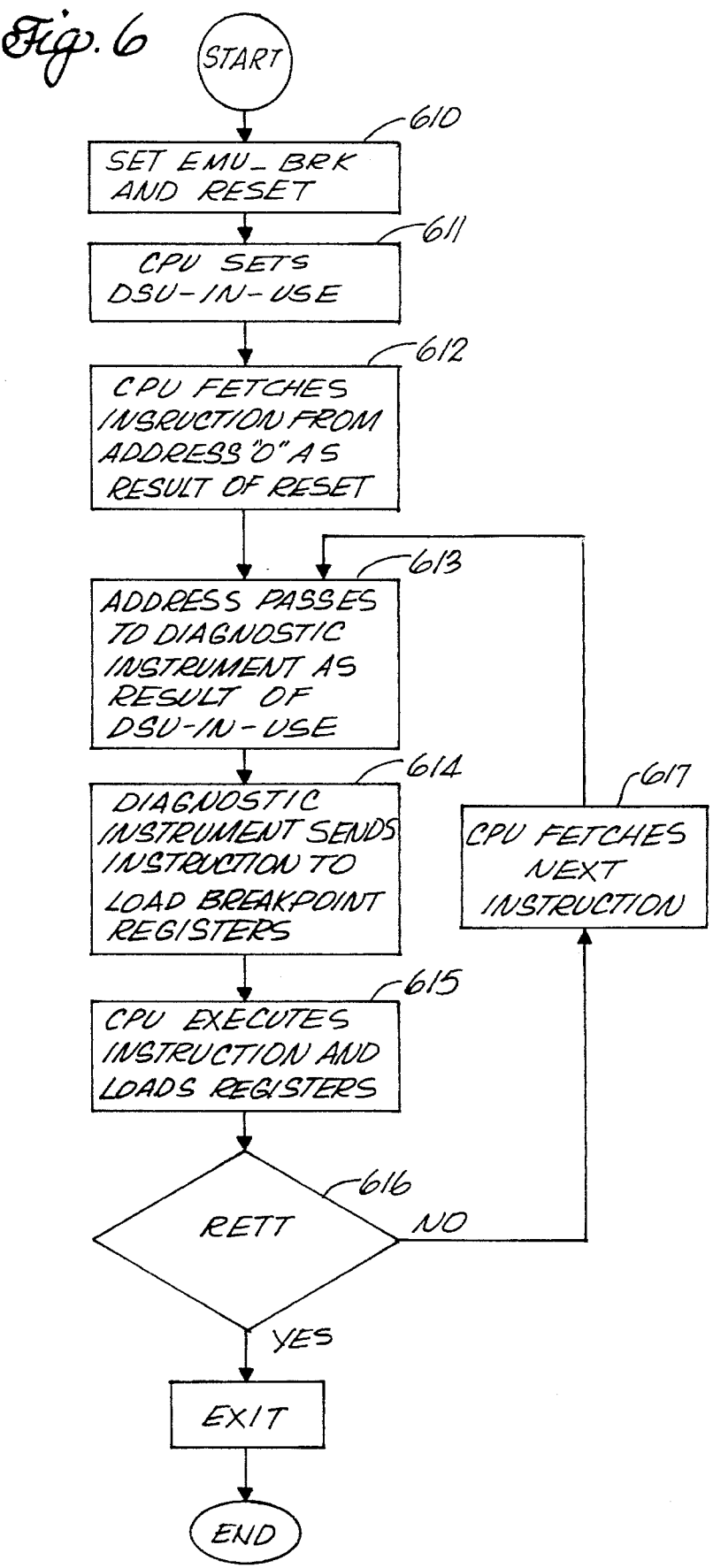
FIG. 6 is a flow chart illustrating the general steps for setting the DSU registers.

It was stated above that breakpoints are normally set by appropriately setting the DSU control and descriptor register. The general steps for setting these DSU registers are shown in the flow chart of FIG. 6.

In block 610, the diagnostic instrument 145 activates the EMU_BRK 204 input to the DSU 130. At the same time, the CPU 100 is reset. When EMU_BRK 204 signal is activated, the CPU 100 is set to a "DSU-IN-USE" mode (block 611) and supervisor mode. Both these modes are represented by respective flags in the CPU 100. Similar to a conventional computer, when the CPU 100 is reset, IU 110 fetches an instruction from address "0" (block 612).

As shown in FIG. 1, the IU 110, DSU 130 and the BIU 120 are all coupled by an internal bus 155. When the IU 110 operates under the supervisor mode, instructions are accessed with ASI=0x9 or ASI=0xB. Moreover, when the CPU 100 operates under the DSU_IN_USE mode, addresses with ASI=0x9 or ASI=0xB are ignored by the BIU 120, but instead processed by the DSU 130. In other words, when the IU 110 accesses the memory under the DSU_IN_USE mode, the memory spaces of ASI=0x9 and ASI=0xB are mapped from the external memory 125 to the memory provided with the diagnostic instrument 145. The mapping is transparent to the IU 110. When IU fetches an instruction from location "0", the fetch operation is performed through the EMU_BUS 140 in a similar manner as it would have been performed to the external memory 145 or to a peripheral device through the system bus 126.

FIG. 10 is a block diagram illustrating how the memory spaces ASI=0x9 and ASI=0xB are mapped to the diagnostic instrument 145 during a breakpoint operation. When the DSU_IN_USE flag is set by a breakpoint trap, it enables the output of either ASI=0x9 or ASI=0xB to output from block 101. The positive output of block 101 is applied to DSU 130 to enable it to pass addresses and memory items between the IU 110 and the diagnostic instrument 145. The negative output of the block 101 is applied to BIU 120 to disable it from passing addresses and memory items between the IU 110 and the system bus 126.

In address "0" of the memory provided with the diagnostic instrument 145, an instruction such as "load DSU register n" is stored. The instruction is sent to the CPU 100 as though it comes from the external memory 126 (block 614). IU 110 processes this instruction and as a result loads the DSU register n (block 615).

When the IU 110 finishes processing this instruction, it fetches the next instruction (block 617). The address of the next instruction is again sent to the DSU 130 because of the above described condition. DSU 130 again forwards it to the diagnostic instrument 145. The process continues until the diagnostic instrument 145 sends an instruction such as a "return from trap (RETT)" instruction (block 618). Upon executing the RETT instruction, the CPU 100 exits the DSU_IN_USE mode and the memory spaces ASI=0x9 and ASI=0xB are again mapped to the external memory 125. From there on, the CPU 100 can start processing of normal application programs.

Figure 7:
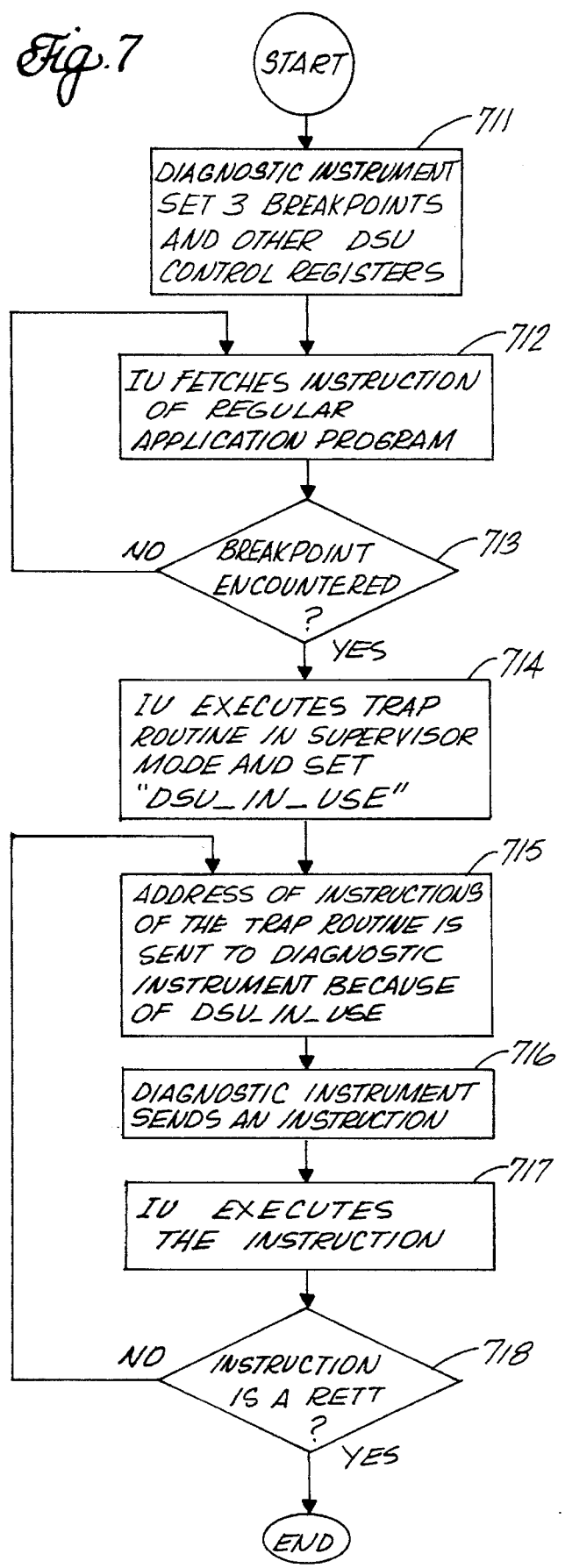
FIG. 7 is a flow chart illustrating the general steps of a breakpoint operation.

FIG. 7 is a flow chart illustrating in general how a typical breakpoint operation is performed. In block 711, breakpoints are set as described above. In block 712, the CPU 100 continues to fetch instructions and process the fetched instructions. When each instruction is processed, a determination is made (block 713) to see if a breakpoint, as defined in the description registers and the DSU control register, is encountered.

If a breakpoint is encountered, a trap is taken and the CPU 100 takes a process switch and enters into supervisor mode and DSU_IN_USE mode. It then executes a trap routine stored in location 0x00000ff0 (block 714) of the supervisor address space.

In processing the trap routine, the IU 110 sends out addresses for instructions and data (block 715). However, because CPU 100 is in DSU-IN-USE mode and supervisor mode (ASI=0x9, 0xB), these addresses are acted upon by the DSU 130 instead of the BIU 120 (block 716). The switch is transparent to the IU 110 which waits for the data/instructions in a similar manner as when it accesses the external memory 125 or the peripheral devices.

DSU 130 outputs these addresses to the diagnostic instrument 145 in a similar manner as BIU 120 outputs addresses to the external memory 125 or to the peripheral devices. The diagnostic instrument 145, in response to the addresses from the IU 110, returns instructions/data in a similar manner as though it is a peripheral device (block 717).

The CPU 100 receives the instructions/data as though it receives instructions/data from the external memory 125 or a peripheral device through BIU 120. When an instruction is received, it is processed by the IU 110 (block 619).

At the end of the trap routine, a "return from trap instruction" (RETT) instruction is sent from the diagnostic instrument 145 to the IU 110.

As an alternative to the above described breakpoint handling procedure, a bit "Disable_Match_BreaK" can be set in the DSU control register. When this flag is set, a break or process switch is not initiated even when the breakpoint encountered. However, a match signal is sent from the CPU 100 to the diagnostic instrument 145 through EMU_SD<3>. The feature is provided to allow the diagnostic to set complex breakpoints.

Figure 8:
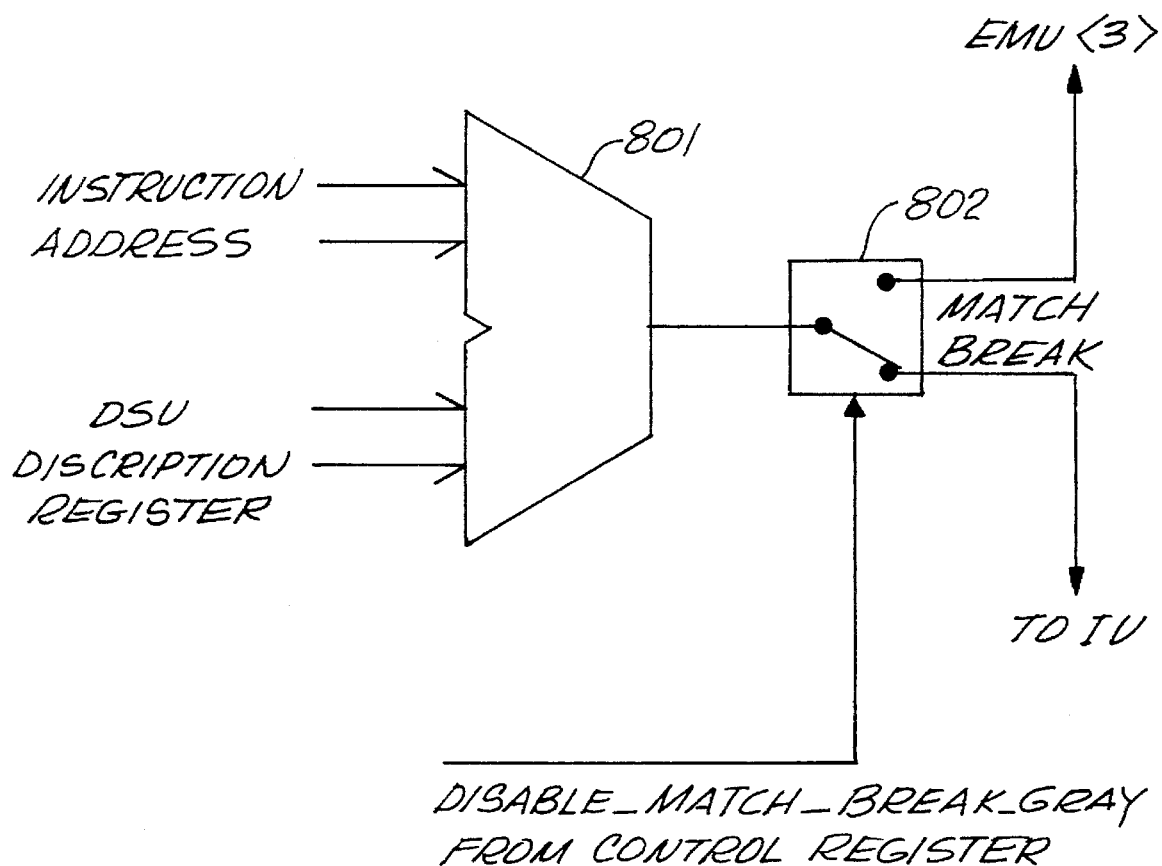
FIG. 8 is a schematic block diagram illustrating means for detecting a breakpoint.

FIG. 8 is a schematic block diagram illustrating how an instruction address breakpoint is detected. The diagram shows a comparator with one input connected to a descriptor register (IA1/IA2/DA1/DA2/DV1/DV2) and another input connected to the program counter (PC) in the IU 110. The output of the comparator 801 is connected to a switch 802 which is controlled by the disable_match_break bit of the DSU control register. When the two inputs match, the output of the comparator 801 is activated. If the disable_match_break bit is off, a break is generated to the IU 110. If the disable_match_break bit is on, no break is generated; however, a signal is sent through EMU_SD<3> to inform the diagnostic instrument 145 that a match is encountered. Other breakpoint conditions, such as data addresses, data values can similarly be checked.

It is recalled that the EMU_BUS 140 is used for communicating instructions, data and addresses between the CPU 100 and the diagnostic instrument 145. According the preferred embodiment of this invention, such communication is achieved by the special protocol as described hereinbelow.

Information are communicated between the DSU 130 and the diagnostic instrument 145 in frames of eight bits each. These eight bits are communicated through EMU_D<3:0> and EMU_SD<3:0>. EMU_D<3:0> of the first frame of each communication is a header which indicates the intent of the communication. Definitions of the various values of the header are listed in Table 8. For example, if DSU 130 wants to fetch an instruction from the diagnostic instrument 145, a header of "0100" is placed on the EMU_SD in the first frame.

EMU_D of the first frame contains the type of data (e.g. byte, half-word) involved. The codes for the different types of data re listed in Table 10.

The second to the fifth frames are used by the DSU 130 to send the addresses of the instruction being fetched.

Responsive to the request, the diagnostic instrument 145 fetches the instruction from the addressed location. The instruction is then communicated to the DSU 130 between the sixth frame and the ninth frame.

After the instruction is sent, the EMU_BUS is set to a high impedance for one frame to signify completion of the communication.

When DSU 130 needs to read data (or an instruction) from the diagnostic instrument 145, a header of "1110" (or 0110) is sent through EMU_SD in the first frame along with a code in EMU_D representing the type of data involved. The address of the requested data is placed between frames 2 to 5.

Responsive to the request, the diagnostic instrument 145 fetches the data from the sent address and places it between frames 6 to 9. At the end of the communication, EMU_BUS is also set to a high impedance state for one frame to signify completion of the operation.

When DSU 130 needs to write data (or an instruction) to the diagnostic instrument 145, a header of 1010 (or 0010) is sent through EMU_SD in the first frame, along with a code in EMU_D representing the type of data being read. The address of the requested data is placed between frames 2 to 5. The data is sent to the diagnostic instrument 145 in frames 6 to 9. At the end of a write operation, the EMU_BUS is not set to a high impedance state as required in the other operation.

If the above operations involve more than one operand, a NEXT operation is performed. Such operation is performed in the similar manner except that no address is sent.

A summary of the different communication protocols is given in Table 11.

By way of example, assuming that the DSU 130 is to write a byte of 0xfe to address 0x65432102 of the diagnostic instrument 145. The values of the nine frames in the write operation is shown in Table 9.

FIG. 9 is a schematic diagram illustrating the interface within the DSU 130 for communicating with diagnostic instrument 145. The interface comprises an multiplexor 901 which is connected to the internal busses 155. An address/data select signal is generated by a DSU control logic to control the multiplexor 901 in selecting whether address or data is output.

The output of the multiplexor 901 is divided into 4 8-bit segments each of which is input into another multiplexor 902. The header, which is generated by the DSU control logic is also connected to an input of multiplexor 902. Multiplexor 902 is controlled by a signal generated by the DSU control logic. As previously described, the DSU control logic first outputs the header from the multiplexor 902 to a transceiver 904. At the same time, the DSU control logic also sends a signal to the transceiver 904 to cause it to transmit the header to EMU_BUS. Subsequently, the four segments of address/data are output sequentially.

When the header and address/data fields are output, if the communication is for fetching instructions or data, the DSU control logic reverses the direction of the transceiver 904 to receive data/instruction from the diagnostic instrument 145. As segments of instruction/data are received from the diagnostic instrument 145, they are received and assembled in the de-multiplexor 903 under the control of the DSU control logic. After they are assembled, the data/instruction is output to the IU 110 through the internal bus 155.

At the end of the communication, a control signal is sent from the DSU control to the transceiver to cause it change to high impedance state.

FIG. 11 is a schematic block diagram illustrating the general structure of the DSU 130. Each of the above functions, breakpoint, trace and communication is performed by a logic block 1103, 1102 and 1101. Each logic block has a controller implemented by a state machine. The DSU control register is connected to the three logic block as 1103, 1102 and 1101 to provide the appropriate control signal. The logic blocks generates output as described and output to the ZMU_B/IU.

The above describes a debug support interface in a single chip CPU that utilizes a second bus for communicating to a diagnostic instrument. With the availability of a second bus, debug support in the CPU is improve. However, while a second bus is provided, the pins created thereby are kept to a minimum.

A description of the particular embodiment is given above for the understanding of the present invention. It will be understood by those skilled in the art that various modifications and additions can be made without substantially departing from the scope of this invention, which is defined by the following claims.

TABLE 1

ASI Address Space Assignment

| ASI<7:0> | Address Space |
|---|---|
| 0x1 | Control Register |
| 0x2 | Instruction Cache Lock |
| 0x3 | Data Cache Lock |
| 0x4–0x7 | Application Definable |
| 0x8 | User Instruction Space |
| 0X9 | Supervisor Instruction Space |
| 0xA | User Data Space |
| 0xB | Supervisor Data Space |
| 0xC | Instruction Cache Tag RAM |
| 0xD | Instruction Cache Data RAM |
| 0xE | Data Cache Tag RAM |
| 0xF | Data Cache Data RAM |
| 0x10–0xFE | Application Definable |
| 0xFF | Reserved for Debug Hardware |

TABLE 2

Pin Assignments of Debug Support Bus EMU_BUS

| | | |
|---|---|---|
| EMU_D<3:0> 201 | | Four bits for communicating data/instructions between the CPU 100 and a diagnostic instrument 145 during a debug or a trace operation. |
| EMU_SD<3:0> 202 | | Four bits for communicating either data or status between the CPU 100 and the diagnostic instrument 145. |
| EMU_ENB 203 | | A bit for informing the diagnostic instrument 145 how EMU_D and EMU_SD are being used. An active EMU_ENB 203 signal indicates that the EMU_D and EMU_SD are being used as a port for inputting/outputting diagnostic instructions, data and addresses. An inactive EMU_ENB 203 signal means that EMU_D and EMU_SD are being used for a performing a trace operation. |
| EMU_BRK 204 | | A bit for use by the diagnostic instrument 145 for controlling the DSU 130. When EMU_ENB 203 is active, EMU_BRK 204 causes a break operation |

TABLE 2-continued

Pin Assignments of Debug Support Bus EMU_BUS

| | |
|---|---|
| | in the CPU 100. When EMU_ENB 203 is inactive, EMU_BRK 204 represents a request for requesting the CPU 100 to wait. |

TABLE 3

DSU Control Register

| Bits<31–24>: | ASI value for Data Address 2: Specifies the ASI match value for Data Address 2. |
|---|---|
| Bits<23–16>: | ASI value for Data Address 1: Specifies the ASI match value for Data Address 1. |
| Bit<15>: | Data Address 2 User/Supervisor Bit: Specifies either a User or Supervisor Mode Match for data address 2. |
| Bit<14>: | Data address User/Supervisor Bit: Specifies either a User or Supervisor Mode match for data address 1. |
| Bit<13>: | Reserved |
| Bit<12>: | Disable_Match_Break |
| Bit<11>: | Trace_Not_Hold_IU |
| Bit<10>: | Trap_Disable_Break_Point |
| Bit<9>: | Reserved. |
| Bit<8>: | Enable Data Address 2 Break: Enables "(1)" or disables "(0)" the breakpoint comparison for Data Address Descriptor 2. |
| Bit<7>: | Enable Data Address 1 Break: Enables "(1)" or disables "(0)" the breakpoint comparison for Data Address Descriptor 1. |
| Bit<6>: | Enable Instruction Address 2 Break: Enables "(1)" or disables "(0)" the breakpoint comparison for Instruction Address Descriptor 2. |
| Bit<5>: | Enable Instruction Address 1 Break: Enables "(1)" or disables "(0)" the breakpoint comparison for Instruction Address Descriptor 1. |
| Bit<4>: | Single Step: Enables single-step operation when set. During single-step operation, a breakpoint trap is issued on every instruction. |
| Bits<3–2>: | Data Value Transaction Type: Determines the class of instructions (loads, stores, or both) that can cause a Data Value breakpoint trap. 00 - Break only on loads; 01 - Break only on stores; 10 - Break on load or store; 11 - Break always. |
| Bit<1>: | Data_Value_Condition: Determines whether a data value inside the range specified by the data value descriptor registers, or outside this range (assuming that the data value mask bit is "0". |
| Bit<0>: | Data_value_Mask: Controls the interpretation of the data value descriptor registers. When the data_value_mask bit is "1", data value descriptor 2 is used as a mask for data value descriptor 1. When the data_value_mask bit is "0", the data value descriptor registers specify the upper and lower bounds of an address range. |

TABLE 4

DSU Status Register

| Bits<31–8>: | Reserved |
|---|---|
| Bit<7>: | DSU_Reg_Exception. |
| Bit<5>: | Data Address 2 Match: set to "1" if address matched. Software should clear this bit after reading it. |

TABLE 4-continued

DSU Status Register

| | |
|---|---|
| Bit<4>: | Data Address 1 Match: set to "1" if address matched. Software should clear this bit after reading it. |
| Bit<3>: | Instruction Address 2 Match: set to "1" if address matched. Software should clear this bit after reading it. |
| Bit<2>: | Instruction Address 1 Match: set to "1" if address matched. Software should clear this bit after reading it. |
| Bit<1>: | -EMU_ENB asserted on reset: set on reset if the -EMU_ENB 203 input is asserted; cleared on reset otherwise. This bit maintains its value until the next reset. -EMU_ENB and EMU_BRK are used to configure the DSU on reset. This bit is read only. |
| Bit<0>: | EMU_BRK asserted on reset: set on reset when the EMU_BRK 204 input is asserted; cleared on reset otherwise. This bit maintains its value until the next reset. -EMU_ENB and EMU_BRK are used to configure the DSU on reset. This bit is read only. |

TABLE 5

Memory Locations of DSU Registers

| | |
|---|---|
| 0x0000FF00 | Instruption Address Descriptor Register 1 |
| 0x0000FF04 | Instruction Address Descriptor Register 2 |
| 0x0000FF08 | Data Address Descriptor Register 1 |
| 0x0000FF0C | Data Address Descriptor Register 2 |
| 0x0000FF10 | Data Value Descriptor Register 1 |
| 0x0000FF14 | Data Value Descriptor Register 2/Mask Register |
| 0x0000FF18 | Debug Control Register |
| 0x0000FF1C | Debug Status Register |

TABLE 6

Interface Signals Between IU 110 and DSU 130

| | |
|---|---|
| ISUPER | A signal from IU 110 to DSU 130, to inform DSU 130 that IU 110 is in supervisor mode. |
| IFETCH | A signal from IU 110 to DSU 130, to inform DSU 130 that an instruction is fetched. |
| I-PLUS-4 | A signal from IU 110 to DSU 130, to inform the DSU 130 that IU 110 is processing a next sequential instruction (i.e. not branch has been taken). |
| TRAP ACK | A signal from IU 110 to DSU 130, to inform DSU 130 that IU 110 has taken a trap. |
| HELD | A signal from IU 110 to DSU 130, to inform DSU 130 that processing of instructions is held. |
| IA TRACE HOLD | A signal from DSU 130 to IU 110 during a trace operation, to request the IU 110 to hold processing until DSU 130 can catch up outputting the trace data. |

TABLE 7

Trace Status
EMU_SD<2:0>

| | |
|---|---|
| 000 | no instruction fetch and no MSN (IA<31:38>) on EMU_D<3:0>. |
| 001 | IU was held and no MSN (IA<31:28>) on EMU_D<3:0>. |
| 010 | sequential fetch and no MSN (IA <31:28>) on EMU_D<3:0>. |
| 011 | sequential fetch and MSN (IA<31:28>) on EMU_D<3:0>. |
| 100 | trap non-sequential and no MSN (IA<31:28>) on EMU_D<3:0>. |
| 101 | trap non-sequential and MSN (IA<31:28>) on EMU_D<3:0>. |
| 110 | indicates branch/jump non-sequential and no MSN (IA<31:28>) on EMU_D<3:0>. |
| 111 | indicates branch/jump non-sequential and MSN (IA<31:28>) on EMU_D<3:0>. |

TABLE 8

Communication Protocol Between DSU and DIAGNOSTIC INSTRUMENT
Header:

| | |
|---|---|
| NOP | EMU_SD<3:0> = 0000 |
| INST | EMU_SD<3:0> = 0100 |
| NEXT | EMU_SD<3:0> = 0101 |
| READ(SI) | EMU_SD<3:0> = 0110 |
| WRITE(SI) | EMU_SD<3:0> = 0010 |
| READ(SD) | EMU_SD<3:0> = 1100 |
| WRITE(SI) | EMU_SD<3:0> = 1010 |

TABLE 9

An Example of A Communication Between DSU and Diagnostic Instrument

| Frame | 1 | 2 | 3 | 4 | 5 | 6 | 7 | 8 | 9 |
|---|---|---|---|---|---|---|---|---|---|
| EMU_SD<3:0> | b"1010" | 0x0 | 0x2 | 0x4 | 0x6 | x | 0xf | x | x |
| EMU)D<3:0> | b"0100" | 0x2 | 0x1 | 0x3 | 0x5 | x | 0xe | x | x |

TABLE 10

Data Type in the HEADER

| | |
|---|---|
| No-Data: | EMU_D [3:0] = 0000 //NOP |
| Byte-0: | EMU_D [3:0] = 0001 //BYTE-READ/WRITE & DA [1:0] = 00 (EMU_D[0] = 1) |
| Byte-1: | EMU_D [3:0] = 0010 //BYTE-READ/WRITE & DA [1:0] = 01 (EMU_D[1] = 1) |
| Byte-2: | EMU_D [3:0] = 0100 //BYTE-READ/WRITE & DA [1:0] = 10 (EMU_D[2] = 1) |
| Byte-3: | EMU_D [3:0] = 1000 //BYTE-READ/WRITE & DA [1:0] = 11 (EMU_D[3] = 1) |
| Upper-Halfword: | EMU_D [3:0] = 0011 //HALFWORD-READ/WRITE & DA [1:0] = 00 |
| Lower-Halfword: | EMU_D [3:0] = 1100 //HALFWORD-READ/WRITE & DA [1:0] = 10 |
| Word: | EMU_D [3:0] = 1111 //INST, NEXT WORD-READ/WRITE |

TABLE 11

Summary of the Protocol

| | |
|---|---|
| NOP | [1 Byte frame] \|HEADER\| |
| NEXT | [5 Byte frame] \|HEADER\|D3/i\|D2/i\|D1/i\|D0/i\|Hi-Z\| |
| WRITE | [8 Byte frame] \|HEADER\|A3/o\|A2/o\|A1/o\|A0/o\|D3/o\|D2/o\|D1/o\|D0o\| |
| READ | [9 Byte frame] \|HEADER\|A3/o\|A2/o\|A1/o\|A0/o\|D3/i\|D2/i\|D1/i\|D0i\|Hi-Z\| |
| INST | [9 Byte frame] \|HEADER\|A3/o\|A2/o\|A1/o\|A0/o\|D3/i\|D2/i\|D1/i\|D0i\|Hi-Z\| |

What is claimed is:

1. A single chip central processing unit (CPU) for real-time debugging connected between an external memory for storing data and instructions and an external diagnostic instrument for setting breakpoints in the CPU and obtaining a trace of instructions processed by the CPU, the CPU comprising:

a processor comprising means for processing data and instructions fetched from the external memory, means for comparing a breakpoint condition received from the external diagnostic instrument to the data and instructions being processed by the processing means, and means for notifying the external diagnostic instrument with an acknowledgement signal when the breakpoint condition matches the data and instructions;

a first bus interface unit for coupling instructions and data between the processor and the external memory before and after the breakpoint condition over a first bus connected between the first bus interface unit and the external memory; and a second bus interface unit for coupling instructions and data between the processor and the external diagnostic instrument after the breakpoint condition has occurred and transmitting status information to the external diagnostic instrument before, during and after the breakpoint condition over a second bus connected between the second bus interface unit and the external diagnostic instrument.

2. A single chip CPU as in claim 1, wherein said first bus has a bandwidth and said second bus has a bandwidth, the bandwidth of said first bus is greater than the bandwidth of said second bus.

3. A single chip CPU as in claim 1, said first and second bus interface units operate to cause said processor to fetch the instructions and data from the external memory through said first bus before and after the breakpoint condition and fetch the instructions and data from the external diagnostic instrument through said second bus during the breakpoint condition.

4. A single chip CPU as in claim 3, wherein the breakpoint condition is a hard breakpoint trap.

5. A single chip CPU as in claim 3, further comprising means for communicating addresses of said instructions to said diagnostic instrument and means for receiving fetched instructions from said diagnostic instrument through said second bus.

6. A single chip CPU as in claim 5, further comprising means for communicating a header before an address is communicated to said diagnostic instrument.

7. A single chip CPU as in claim 6, further comprising means for communicating said header in a first time frame, means for communicating said address in at least one second time frame and means for communicating said fetched instruction in at least one third time frame.

8. A single chip CPU as in claim 7, further comprising means for communicating said header in one first time frame, means for communicating said address in four time frames and means for communicating said instruction in four time frames.

9. A single chip CPU as in claim 8, further comprising means for communicating a stopper in a time frame after said first, second and third time frames.

10. A single chip CPU as in claim 9, further comprising means for providing a high impedance between said second bus interface unit and said second bus in said time frame wherein the stopper is communicated.

11. A single chip CPU as in claim 1, further comprising:

means for setting at least one criterion for initiating a breakpoint condition;

means for comparing the criterion to a value generated during execution by the processor; and means for transmitting the breakpoint acknowledgement signal to the external diagnostic instrument via said second bus when the criterion is satisfied.

12. A single chip CPU as in claim 11, further including means for selectively initiating a process switch when said breakpoint condition is met.

13. A single chip CPU as in claim 11, further including means for inhibiting a process switch when said breakpoint condition is not met.

14. A single chip CPU as in claim 1, wherein said second bus comprises a first set of signal lines for outputting addresses of instructions executed by said processor and a second set of signal lines for outputting status information when said instruction addresses are output.

15. A single chip CPU as in claim 14, wherein each instruction address is output in segments comprised of a most-significant segment and a plurality of additional segments.

16. A single chip CPU as in claim 14, wherein the status information indicates whether an instruction has been fetched by the processor and whether an address segment accompanying the status information is the most-significant segment.

17. A single chip CPU as in claim 14, wherein the status information indicates whether the processor is in a hold state and whether an accompanying address segment is the most-significant address segment.

18. A single chip CPU as in claim 14, wherein the status information indicates whether an instruction fetched by the processor is a next sequential instruction to a preceding instruction and whether an accompanying address segment is the most-significant address segment.

19. A single chip CPU as in claim 14, wherein the status information indicates whether a breakpoint condition has occurred, whether an instruction fetched by the processor is a next sequential instruction to a preceding instruction and whether an accompanying address segment is the most-significant address segment.

20. A single chip CPU as in claim 1, wherein the status information indicates whether a branching instruction was fetched by the processor, whether an instruction fetched by the processor is a next sequential instruction to a preceding instruction and whether an accompanying address segment is the most-significant address segment.

21. A CPU as in claim 1, wherein the breakpoint condition is a correlation between a predefined address and an address for at least one of the instructions.

22. A CPU as in claim 1, wherein the breakpoint condition is a correlation between a predefined address and an address for at least one of the data.

23. A CPU as in claim 1, wherein the breakpoint condition is a correlation between a predefined value and a value for at least one of the data.

24. In a computer system having a processor for processing instructions and a debug support unit for tracing the processing of the instructions, the processor and the debug support unit being incorporated onto an integrated circuit and being interconnected by a bus, a method for tracing in real time instructions processed by the processor using the debug support unit, comprising the steps of:

receiving an instruction address with the debug support unit for an instruction to be processed next from the processor over the bus;

outputting with the debug support unit the instruction address and a trace status block for indicating trace status information over an output bus with a width smaller in number of bits than the instruction address, the instruction address being output in more than one segment, each segment with a width smaller in number of bits than the instruction address; and repeating the outputting step with the debug support unit until each of the segments comprising the instruction address has been output.

25. A method as in claim 24, wherein the instruction address comprises a most significant segment followed by at least one next most significant segment, the outputting step further comprising:

outputting the most significant segment; and repeating the outputting step for each of the next most significant segments.

26. A method as in claim 25, wherein the trace status block contains a most significant segment indication representing that the segment being output in the outputting step is the most significant segment, further comprising the step of:

setting the most significant segment indication prior to the outputting step whenever a new instruction address is received in the receiving step.

27. A method as in claim 25, wherein the instruction address comprises a least significant segment and the least significant segment contains a supervisor state indication representing that the processor is in a supervisor state, further comprising the step of:

setting the supervisor state indication with the debug support unit prior to the outputting step and in response to a supervisor signal transmitted by the processor to the debug support unit indicating that the processor is in the supervisor state.

28. A method as in claim 25, wherein the least significant segment contains a trap indication representing that the processor has taken a trap, further comprising the step of:

setting the trap indication with the debug support unit prior to the outputting step and in response to a trap signal transmitted by the processor to the debug support unit indicating that the processor has taken the trap.

29. A method as in claim 24, wherein the processor has a program counter for storing an instruction address, the debug support unit having access to the program counter, and the method further comprising the step of:

storing an instruction address for an instruction to be executed next by the processor into the program counter; whereby the receiving step further comprises receiving the instruction address from the program counter.

30. A method as in claim 24, wherein the computer system has an instruction cache containing a plurality of entries for storing instructions staged from a main memory, and the processor, the debug support unit and the instruction cache being interconnected by an address bus, the method further comprising the step of:

transmitting an instruction address from the processor to the instruction cache during an instruction fetch over the address bus; whereby the receiving step further comprises receiving the instruction address from the address bus.

31. A method as in claim 30, wherein the processor, the debug support unit and the instruction cache are incorporated onto the same integrated circuit.

32. A method as in claim 24, wherein the debug support unit contains a no-hold indication representing that the processing of instructions by the processor is not to be held, the method further comprising the steps of:

clearing the no-hold indication in response to a nonassertion of a no-hold signal transmitted by the processor;

holding the processing of instructions by the processor during the outputting step and repeating step until the instruction address has been output in the outputting step in response to a non-sequential instruction signal transmitted by the processor to indicate that a next instruction is not sequential in order of processing; and resuming the processing of instructions by the processor upon the completion of the outputting step.

33. A method as in claim 24, wherein the trace status block contains a no-branch indication representing that a next instruction is sequential in order of processing to an instruction being output in the outputting step, further comprising the step of:

setting the no-branch indication prior to the outputting step and in response to a sequential instruction signal transmitted by the processor to indicate that a next instruction is sequential in order of processing.

34. In a computer system having a processor for processing instructions and a debug support unit for monitoring the processing of the instructions, the processor and the debug support unit being incorporated onto the same circuit and connected by a bus, the debug support unit comprising a plurality of descriptor registers for storing program values and a debug support interface for interfacing to a diagnostic instrument, a method for setting breakpoints in the processing of instructions in a computer program using a debug support unit, comprising the steps of:

loading a program value to be monitored by the debug support unit into at least one of the descriptor registers, the program value being received from the diagnostic instrument over the debug support interface;

monitoring with the debug support unit instructions processed by the processor by comparing each such instruction to the program value stored in the at least one descriptor register, each such instruction being received from the processor over the bus, a match between the instruction and the program value indicating to the debug support unit that a breakpoint has been encountered;

taking a trap if the breakpoint is indicated by performing a process switch with the processor, setting the processor into a supervisor mode and setting a debug indication in the processor for representing that the debug support unit is in use;

executing a trap routine stored in a supervisor address space which includes fetching instructions and data values for processing by the processor from the debug support unit over the bus and executing the instructions with the data values on the processor; and returning from the trap routine by performing a process switch with the processor, setting the processor into a user mode and clearing the debug indication.

35. A method as in claim 34, wherein the debug support unit further comprises a debug control register which includes a data value mask bit for representing that the breakpoint is a mask operation, the loading step further comprising setting the data value mask bit, and the monitoring step further comprising masking each such instruction using the program value.

36. A method as in claim 34, wherein the debug support unit further comprises a debug control register which includes a data value condition bit for representing that the breakpoint is a range comparison operation, the loading step further comprising loading a pair of program values into a pair of descriptor registers, and the monitoring step further comprises comparing each such instruction to the pair of program values using the pair of descriptor registers to determine whether the instruction falls between the pair of program values.

37. A method as in claim 34, wherein the setting step further comprises a debug control register which includes a data value condition bit for representing that the breakpoint is a range comparison operation, the loading step further comprising loading a pair of program values into a pair of descriptor registers, and the monitoring step further comprising comparing each such instruction to the pair of program values using the pair of descriptor registers to determine whether the instruction falls outside the pair of program values.

38. A method as in claim 34, wherein each program value comprises an instruction address for a program instruction.

39. A method as in claim 34, wherein each program value comprises a data value address for a program data value.

40. A method as in claim 34, wherein each program value comprises a constant value.

41. A method as in claim 34, wherein the debug support unit further comprises a debug control register which includes an external break signal for representing that the breakpoint condition is to be triggered asynchronously whereby the taking and executing steps are performed immediately responsive to an activation of the external break signal.

42. A method as in claim 34, wherein the program value to be monitored is an instruction address.

43. A method as in claim 34, wherein the program value to be monitored is a data address.

44. A method as in claim 34, wherein the program value to be monitored is a data value.

* * * * *